US012678713B2

(12) United States Patent
Hwang et al.

(10) Patent No.: US 12,678,713 B2
(45) Date of Patent: Jul. 14, 2026

(54) SYSTEM FOR CONTINUOUS OIL/WATER SEPARATION USING SUPERHYDROPHILIC OIL/WATER SEPARATION FILTER

(71) Applicant: POSTECH Research and Business Development Foundation, Pohang-si (KR)

(72) Inventors: Woonbong Hwang, Seoul (KR); Handong Cho, Daejeon (KR); Seongmin Kim, Cheonan-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 490 days.

(21) Appl. No.: 17/759,063

(22) PCT Filed: Dec. 1, 2020

(86) PCT No.: PCT/KR2020/017414
§ 371 (c)(1),
(2) Date: Jul. 19, 2022

(87) PCT Pub. No.: WO2021/194044
PCT Pub. Date: Sep. 30, 2021

(65) Prior Publication Data
US 2023/0039303 A1      Feb. 9, 2023

(30) Foreign Application Priority Data

Mar. 23, 2020      (KR) ........................ 10-2020-0035023

(51) Int. Cl.
*B01D 17/02*      (2006.01)
*B01D 17/04*      (2006.01)
(Continued)

(52) U.S. Cl.
CPC ....... *B01D 17/045* (2013.01); *B01D 17/0202* (2013.01); *B01D 17/12* (2013.01);
(Continued)

(58) Field of Classification Search
CPC .............. B01D 17/085; B01D 17/0202; B01D 17/045; B01D 17/12; B01D 35/02;
(Continued)

(56) References Cited

U.S. PATENT DOCUMENTS 4,021,281 A * 5/1977 Pall ........................ B01D 29/111
156/193
6,169,045 B1 * 1/2001 Pike ..................... B01D 39/163
442/352

(Continued)

FOREIGN PATENT DOCUMENTS

CN      102029079      4/2011
CN      108786180 A  * 11/2018
(Continued)

OTHER PUBLICATIONS

Accudynetest.com website page (Year: 2025).*
(Continued)

*Primary Examiner* — Patrick Orme
*Assistant Examiner* — William Addison Geisbert
(74) *Attorney, Agent, or Firm* — LEX IP MEISTER, PLLC

(57) ABSTRACT

A continuous oil-water separation system includes a storage tank having an inlet and an outlet and storing an oil-water mixture, a filter housing including a storage space having a predetermined height and having an inlet connected to the outflow portion of the storage tank to allow the oil-water mixture to flow in therethrough, a water drain hole allowing water separated from the oil-water mixture to be discharged therethrough, and an outlet allowing a residual oil-water (Continued)

mixture to flow out therethrough, a super-hydrophilic oil-water separation filter positioned in the storage space of the filter housing to absorb water from the oil-water mixture and connected to the water drain hole to allow the absorbed water to be discharged therethrough, a pressure control valve installed on an outlet pipe extending from the outlet, and a hydrophobic membrane connected to a rear end of the pressure control valve on the outlet pipe.

12 Claims, 11 Drawing Sheets

(51) Int. Cl.

| | |
|---|---|
| *B01D 17/12* | (2006.01) |
| *B01D 35/147* | (2006.01) |
| *B01D 35/30* | (2006.01) |
| *B01D 39/16* | (2006.01) |
| *B01D 69/02* | (2006.01) |
| *C02F 1/00* | (2023.01) |
| *C02F 1/40* | (2023.01) |
| *C02F 1/44* | (2023.01) |
| *D06M 15/285* | (2006.01) |
| *D06M 15/59* | (2006.01) |
| *C02F 101/32* | (2006.01) |
| *D06M 101/20* | (2006.01) |
| *D06M 101/22* | (2006.01) |
| *D06M 101/26* | (2006.01) |

(52) U.S. Cl.
CPC ......... *B01D 35/1475* (2013.01); *B01D 35/30* (2013.01); *B01D 39/163* (2013.01); *B01D 69/02* (2013.01); *C02F 1/001* (2013.01); *C02F 1/40* (2013.01); *C02F 1/44* (2013.01); *D06M 15/285* (2013.01); *D06M 15/59* (2013.01); *B01D 2239/0421* (2013.01); *B01D 2239/0492* (2013.01); *B01D 2325/38* (2013.01); *C02F 2101/32* (2013.01); *C02F 2201/005* (2013.01); *D06M 2101/20* (2013.01); *D06M 2101/22* (2013.01); *D06M 2101/26* (2013.01); *D06M 2200/12* (2013.01)

(58) Field of Classification Search
CPC ............ B01D 35/1475; B01D 35/1573; B01D 35/30; B01D 39/1623; B01D 39/163; B01D 61/00; B01D 61/58; B01D 63/06; B01D 69/02; B01D 69/10; B01D 71/64; B01D 2239/0421; B01D 2239/0492; B01D 2239/10; B01D 2311/25; B01D 2311/2646; B01D 2313/20; B01D 2317/022; B01D 2325/36; B01D 2325/38; B01D 2325/50; C02F 1/001; C02F 1/40; C02F 1/44; C02F 2101/32; C02F 2201/005; C10G 33/06; D06M 15/285; D06M 15/59; D06M 2101/20; D06M 2101/22; D06M 2101/26; D06M 2200/12
See application file for complete search history.

(56) References Cited

U.S. PATENT DOCUMENTS

| | | | | |
|---|---|---|---|---|
| 8,287,890 | B2 * | 10/2012 | Elton ................. | C08G 18/4833 |
| | | | | 424/78.17 |
| 2007/0221558 | A1 | 9/2007 | Oserod | |
| 2018/0243666 | A1 | 8/2018 | Karabacak et al. | |

FOREIGN PATENT DOCUMENTS

| | | | | |
|---|---|---|---|---|
| CN | 208320055 | | 1/2019 | |
| EP | 2815805 | | 12/2014 | |
| EP | 2815805 | A1 * | 12/2014 | .......... B01D 17/085 |
| JP | 2005-034752 | | 2/2005 | |
| JP | 2016-064405 | | 4/2016 | |
| KR | 10-2004-0070110 | | 8/2004 | |
| KR | 20110115856 | A * | 10/2011 | .......... B01D 71/642 |
| KR | 10-2014-0097001 | | 8/2014 | |
| KR | 10-2014-0148316 | | 12/2014 | |
| KR | 10-2017-0029242 | | 3/2017 | |

OTHER PUBLICATIONS

Advanced Composites and Hybrid Materials (2020) 3:167-176 (Year: 2020).*
Shop.pall.com website page (Year: 2025).*
EPO, Search Report of EP 20927252.5 dated Mar. 4, 2024.
S. Varvarenko et al., "Covalent grafting of polyacrylamide-based hydrogels to a polypropylene surface activated with functional polyperoxide", Reactive and Functional Polymers, vol. 70, Issue 9, Sep. 1, 2010, pp. 647-655.
Wenbin Zhang et al., "Salt-Induced Fabrication of Superhydrophilic and Underwater Superoleophobic PAA-g-PVDF Membranes for Effective Separation of Oil-in-Water Emulsions", Angewandte Chemie International Edition, vol. 53, No. 3, Dec. 4, 2013, pp. 856-860.
EPO, Search Report of EP 20927252.5 dated May 27, 2024.

* cited by examiner (B)

SYSTEM FOR CONTINUOUS OIL/WATER SEPARATION USING SUPERHYDROPHILIC OIL/WATER SEPARATION FILTER

TECHNICAL FIELD

The present disclosure relates to an oil-water separation system using an oil-water separation filter for separating water and oil.

BACKGROUND ART

A solid has an intrinsic surface energy, and when it comes into contact with any liquid, the liquid either wets or does not wet a solid surface due to surface energy of the solid and the liquid. When a contact angle between a surface and water is 90 degrees or less, the surface is called a hydrophilic surface, and when a contact angle with water is 10 degrees or less and the surface is quickly wetted by water, the surface is called a super-hydrophilic surface. Such a super-hydrophilic surface may be implemented by coating the surface with a material having a hydrophilic functional group or by coating the surface with hydrophilic nanoparticles or the like.

Substances having a hydrophilic functional group include dopamine and the like. However, since these materials have high reactivity with other chemical functional groups, they may easily lose hydrophilicity when the hydrophilic functional group disappears. In addition, a hydrophilic surface body may be formed using chemically stable nanoparticles such as titanium dioxide ($TiO_2$) or silicon dioxide ($SiO_2$), but the surface body may easily lose hydrophilicity thereof due to weak bonding to a substrate.

Meanwhile, as interest in a reduction of domestic and foreign water pollution pollutants increases, water quality improvement technology has come to prominence. In particular, oil in industrial wastewater or oil spilled into the sea has a significant effect on the aquatic ecosystem, and thus, research on a method for separating water and oil has been actively conducted. An existing oil-water separation method used in the industries is a method using a difference in specific gravity between water and oil, but this treatment method takes a lot of time, requires a large area treatment facility, and has low oil-water separation efficiency.

In addition, an existing filter filtration type oil-water separation system is a system for recovering water or oil using a super-hydrophilic or super-hydrophobic oil-water separation filter, and an unrecovered fluid does not pass through the filter and continues to accumulate. As a treatment capacity increases, the amount of unrecovered fluid increases to increase an internal pressure of the oil-water separation device, resultantly deteriorating oil-water separation filter performance. Therefore, in order to treat a large amount of oil and water in the existing oil-water separation device, the existing oil-water separation device requires a process of recovering an unfiltered fluid and a process of cleaning a filter, making it difficult to continuously treat oil and water, and thus, the existing devices cannot be applied to the oil-water separation industry. Therefore, it is necessary to develop a new oil-water separation system that may simultaneously and continuously recover a large amount of water and oil.

DISCLOSURE

Technical Problem

An aspect of the present disclosure is to provide a continuous oil-water separation system using a super-hydrophilic oil-water separation filter having a super-hydrophilic surface layer implemented as a hydrophilic hydrogel layer strongly bonded to a surface of a polymer fiber by applying a super-hydrophilic surface treatment method to a filtration filter or a polymer fiber for a filtration filter.

Another aspect of the present disclosure is to provide a continuous oil-water separation system in which the oil-water separation efficiency is improved by recirculating a residual oil-water mixture, while combining a super-hydrophilic oil-water separation filter and a super-hydrophobic oil-water separation filter.

However, the problems to be solved by the exemplary embodiments of the present disclosure are not limited to the above problems and may be variously expanded within the scope of the technical idea included in the present disclosure.

Technical Solution

An exemplary embodiment of the present disclosure provides a continuous oil-water separation system including: a storage tank having an inflow portion and an outflow portion and storing an oil-water mixture; a filter housing including a storage space having a predetermined height and including an inlet connected to the outflow portion of the storage tank to allow the oil-water mixture to flow in therethrough, a water drain hole allowing water separated from the oil-water mixture to be discharged therethrough, and an outlet allowing a residual oil-water mixture to flow out therethrough; a super-hydrophilic oil-water separation filter positioned in the storage space of the filter housing to absorb water from the oil-water mixture and connected to the water drain hole to allow the absorbed water to be discharged therethrough; a pressure control valve installed on an outlet pipe extending from the outlet; and a hydrophobic membrane connected to a rear end of the pressure control valve on the outlet pipe.

The inlet may be fluidly connected to the lower end of the storage space of the filter housing, the outlet may be fluidly connected to the upper end of the storage space of the filter housing, and the water drain hole may be fluidly connected to the lower end of the super-hydrophilic oil-water separation filter.

The super-hydrophilic oil-water separation filter may be provided in a central portion of the filter housing in a columnar shape extending in a height direction of the filter housing.

The continuous oil-water separation system may further include a water drain pipe connected to the water drain hole of the filter housing; and a first flow rate control valve installed on the water drain pipe to control opening and closing of the water drain hole.

The continuous oil-water separation system further includes a recovery pipe connecting the outlet pipe at the rear end of the pressure control valve and the inlet of the storage tank; and a second flow rate control valve installed on the recovery pipe to control opening and closing of the recovery pipe.

Another exemplary embodiment of the present disclosure provides a continuous oil-water separation system including: a storage tank having an inflow portion and an outflow portion and storing an oil-water mixture; a filter housing having a storage space having a predetermined height and including an inlet connected to the outflow portion of the storage tank to allow the oil-water mixture to flow in therethrough, an oil drain hole allowing oil separated from the oil-water mixture to be discharged therethrough, and an outlet allowing a residual oil-water mixture to flow out therethrough; a super-hydrophobic oil-water separation filter positioned in the storage space of the filter housing to absorb oil from the oil-water mixture and connected to the oil drain hole to allow the absorbed oil to be discharged therethrough; a pressure control valve installed on an outlet pipe extending from the outlet; and a hydrophilic membrane connected to a rear end of the pressure control valve on the outlet pipe.

The inlet may be fluidly connected to an upper end of the storage space of the filter housing, the outlet may be fluidly connected to a lower end of the storage space of the filter housing, and the oil drain hole may be fluidly connected to an upper end of the super-hydrophobic oil-water separation filter.

The super-hydrophobic oil-water separation filter may be provided in a central portion of the filter housing in a columnar shape extending in a height direction of the filter housing.

The continuous oil-water separation system may further include an oil drain pipe connected to an oil drain hole of the filter housing; and a first flow rate control valve installed on the oil drain pipe to control opening and closing of the oil drain hole.

The continuous oil-water separation system may further include a recovery pipe connecting an outlet pipe at a rear end of the pressure control valve and the inflow portion of the storage tank; and a second flow rate control valve installed on the recovery pipe to control opening and closing of the recovery pipe.

Another exemplary embodiment of the present disclosure provides a continuous oil-water separation system including: a storage tank having an inflow portion and an outflow portion and storing an oil-water mixture; a first filter housing having a storage space having a predetermined height and including a first inlet connected to the outflow portion of the storage tank to allow the oil-water mixture to flow in therethrough, a water drain hole allowing water separated from the oil-water mixture to be discharged therethrough, and a first outlet allowing a residual oil-water mixture to flow out therethrough; super-hydrophilic oil-water separation filter positioned in the storage space of the first filter housing to absorb water from the oil-water mixture and connected to the water drain hole to allow the absorbed water to be discharged therethrough; a first pressure control valve connected to the first outlet to control opening and closing of the first outlet; a second filter housing including a storage space having a predetermined height and having a second inlet connected to the first outlet of the first filter housing to allow the oil-water mixture to flow in therethrough, an oil drain hole allowing oil separated from the oil-water mixture to be discharged therethrough, and a second outlet allowing a residual oil-water mixture to be discharged therethrough; a super-hydrophobic oil-water separation filter positioned within the storage space of the second filter housing to absorb oil from the oil-water mixture, and connected to the oil drain hole to discharge the absorbed oil; a second pressure control valve installed on an outlet pipe extending from the second outlet; and a super-hydrophilic membrane connected to a rear end of the second pressure control valve on the outlet pipe.

The first inlet may be fluidly connected to a lower end of the storage space of the first filter housing, the first outlet may be fluidly connected to an upper end of the storage space of the first filter housing, and the water drain hole may be fluidly connected to a lower end of the super-hydrophilic oil-water separation filter.

The second inlet may be fluidly connected to an upper end of the storage space of the second filter housing, the second outlet may be fluidly connected to a lower end of the storage space of the second filter housing, and the oil drain hole may be fluidly connected to an upper end of the super-hydrophobic oil-water separation filter.

The super-hydrophilic oil-water separation filter may be provided in a central portion of the first filter housing in a columnar shape extending in a height direction of the first filter housing.

The super-hydrophobic oil-water separation filter may be provided in a central portion of the second filter housing in a columnar shape extending in a height direction of the second filter housing.

The continuous oil-water separation system may further include a water drain pipe connected to the water drain hole of the first filter housing, and a first flow rate control valve installed on the water drain pipe to control opening and closing of the water drain hole.

The continuous oil-water separation system may further include an oil drain pipe connected to the water drain hole of the second filter housing, and a second flow rate control valve installed on the oil drain pipe to control opening and closing of the oil drain hole.

The continuous oil-water separation system may further include: a recovery pipe connecting an outlet pipe at a rear end of the second pressure control valve to the inflow portion of the storage tank; and a third flow rate control valve installed on the recovery pipe to control opening and closing of the recovery pipe.

A filter used in an example of the present disclosure relates to a filtration medium including a polymer fiber for manufacturing a filtration filter or a thermosetting coating layer and a hydrogel layer formed on the surface of the polymer fiber included in the filtration filter, or an oil-water separation filtration filter including the filtration medium, for example, a depth filter, wherein the thermosetting coating layer and the hydrogel layer are bonded by acrylamide crosslinking.

The surface-modified polymer fiber and the filtration medium or filtration filter including the polymer fiber may have super-hydrophilicity having a contact angle of 10° or less with respect to water in the air and/or oleophobicity having a contact angle of 150° to 180°, more preferably, 150° to 170°, with respect to oil in water.

The filter used in an example of the present disclosure relates to an oil-water separation filter including a polymer-based fiber, and a thermosetting coating layer and a hydrogel layer formed on a surface of the fiber. More specifically, the filter relates to a filtration medium including a polymer fiber for manufacturing a filtration filter or a thermosetting coating layer and a hydrogel layer formed on the surface of the polymer fiber included in the filtration filter, or an oil-water separation filtration filter including the filtration medium, for example, a depth filter, wherein the thermosetting coating layer and the hydrogel layer are bonded by acrylamide crosslinking.

The oil-water separation filtration filter may have super-hydrophilicity with a contact angle of 10° or less with respect to water in the air and/or oleophobicity with a contact angle of 150° to 180°, more preferably, 150° to 170°, with respect to oil in water.

The oil-water separation filter according to the present disclosure is a super-hydrophilic filter which has a contact angle of 10° or less with respect to water and is completely wet with water to form a water film, thus having very low adhesion with oil. Therefore, water in an oil-water mixture passes and oil is blocked by the water film, thus performing oil-water separation. The super-hydrophilic filter is rarely contaminated by oil, so it may be usefully used as an oil-water separation filter.

As an example of the filtration filter according to the present disclosure, a depth filter may have a structure in which polymer fibers are stacked in multiple layers to have a cylindrical shape. Such a cylindrical depth filtration filter performs a filtration function by a mechanism for collecting particles inside the filter, while passing through a non-linear movement path in a media layer having a thickness of several mm to tens of mm, and has a large surface area per unit volume, which is thus very effective for removing contaminants. For example, the polymer filter is formed of polymer fibers having a diameter of 10 to 50 μm, these polymer fibers are randomly crossed to form pores, and the pores have a diameter of 100 μm or less, for example, 10 μm to 100 μm. Fluid passes through these pores, and contaminants do not pass through the pores and accumulate outside the filter.

The polymer substrate may include one or more selected from the group consisting of polypropylene (PP), polyethylene (PE), polyvinylidene fluoride (PVDF) and polytetrafluoroethylene (PTFE).

The polyimide (PI) may be an aromatic heterocyclo compound.

Advantageous Effects

The continuous oil-water separation system according to the exemplary embodiment may perform recovery by simultaneously separating an oil-water mixture into high-purity water and oil. The system may maintain filter efficiency by maintaining internal pressure of a filter housing by preventing the oil-water mixture from accumulating inside the filter, and some oil-water mixture that has not been filtered may be recycled back to an initial oil-water mixture.

Therefore, in the continuous oil-water separation system according to the exemplary embodiment, since all the oil-water mixture introduced into the device is discharged, the internal pressure is maintained, and since there is no need for a separate oil/water recovery process, a large amount of oil and water may be continuously separated.

DESCRIPTION OF THE DRAWINGS

FIG. 6 is a photograph of a system actually implementing a continuous oil-water separation system using a super-hydrophilic oil-water separation filter schematically shown in FIG. 1.

FIG. 11 is a view sequentially illustrating a process of forming a hydrogel layer by multi-wet coating a surface of a filtration filter formed of polymer fibers.

MODE FOR INVENTION

Figure 1:
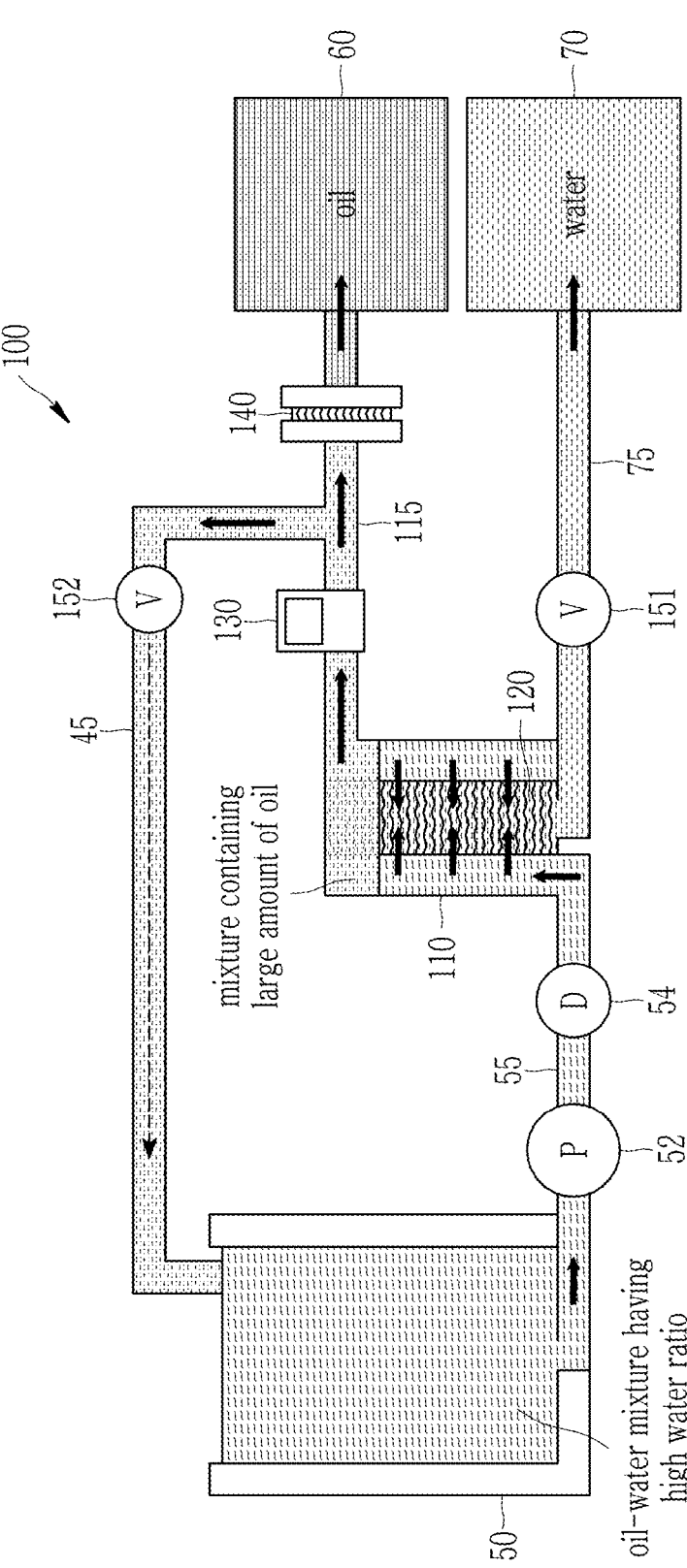
FIG. 1 is a configuration diagram schematically illustrating a continuous oil-water separation system using a super-hydrophilic oil-water separation filter and a pressure control valve according to an exemplary embodiment of the present disclosure.

Hereinafter, exemplary embodiments of the present disclosure will be described in detail with reference to the accompanying drawings to allow those skilled in the art to practice the present disclosure. Portions unrelated to the description may be omitted in order to more clearly describe the present disclosure, and the same or similar components may be denoted by the same reference numerals throughout the present specification. The accompanying drawings of the present disclosure aim to facilitate understanding of the present disclosure and should not be construed as limited to the accompanying drawings. Also, the present disclosure is not limited to a specific disclosed form but includes all modifications, equivalents, and substitutions without departing from the scope and spirit of the present disclosure.

Terms including ordinals, such as first, second, etc., may be used to describe various elements but such elements are not limited to the above terms. The above terms are used only for the purpose of distinguishing one component from another.

When it is mentioned that a certain element is "connected to" or "electrically connected to" a second element, the first element may be directly connected or electrically connected to the second element, but it should be understood that a third element may intervene therebetween. Meanwhile, when it is mentioned that a certain element is "directly connected to" or "directly electrically connected to" a second element, it should be understood that there is no third element therebetween.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof. Therefore, unless explicitly described to the contrary, the word "comprise" and variations such as "comprises" or "comprising", will be understood to imply the inclusion of stated elements but not the exclusion of any other elements.

FIG. 1 is a configuration diagram schematically illustrating a continuous oil-water separation system using a superhydrophilic oil-water separation filter and a pressure control valve according to an exemplary embodiment of the present disclosure.

Referring to FIG. 1, a continuous oil-water separation system 100 according to the present exemplary embodiment may be configured by connecting a filter housing 110 in which a super-hydrophilic oil-water separation filter 120 is built to a storage tank 50 storing an oil-water mixture.

The storage tank 50 may include an inflow portion and an outflow portion, an oil-water mixture may be discharged through the outflow portion and supplied to the filter housing 110, and an oil-water mixture may be supplied to the storage tank 50 from the outside through the inflow portion. A supply pipe 55 may be provided to connect the outflow portion of the storage tank 50 and an inlet of the filter housing 110, through which the oil-water mixture may be transported. A pump 52 and a damper 54 may be installed on the supply pipe 55 to control supply of the oil-water mixture.

The filter housing 110 may include a storage space having a predetermined height, and may have an inlet, a water drain hole, and an outlet. The inlet may be connected to the outflow portion of the storage tank 50 so that the oil-water mixture may be introduced, and the outlet may allow a residual oil-water mixture to flow out therethrough after oil-water separation. In this case, the inlet may be fluidly connected to a lower end of the storage space of the filter housing 110, and the outlet may be fluidly connected to an upper end of the storage space of the filter housing 110. The water drain hole may be fluidly connected to a lower end of the super-hydrophilic oil-water separation filter 120 so that water separated from the oil-water mixture may be discharged therethrough.

A water drain pipe 75 may be connected to the water drain hole of the filter housing 110, and the water drain pipe 75 may be connected to the water recovery unit 70. In addition, a first flow rate control valve 151 may be installed on the water drain pipe 75 to control opening and closing of the water drain hole. That is, the first flow rate control valve 151 may control the opening/closing degree of the water drain hole to adjust a flow rate passing therethrough.

The super-hydrophilic oil-water separation filter 120 may be located in the storage space of the filter housing 110 and may absorb water from the supplied oil-water mixture. The water drain hole may be connected to the super-hydrophilic oil-water separation filter 120 to discharge the absorbed water. The super-hydrophilic oil-water separation filter 120 may be provided in a central portion of the filter housing 110 in a columnar shape extending in a height direction of the filter housing 110.

An outlet pipe 115 may extend from the outlet of the filter housing 110. A pressure control valve 130 may be installed on the outlet pipe 115 to sense pressure inside the filter housing 110 and to control opening and closing of the outlet according to a set pressure. A super-hydrophobic membrane 140 may be connected to a rear end of the pressure control valve 130 on the outlet pipe 115. The outlet pipe 115 may be connected to an oil recovery unit 60 via super-hydrophobic membrane 140.

A recovery pipe 45 connecting the outlet pipe 115 at the rear end of the pressure control valve 130 to the inflow portion of the storage tank 50 may be provided. A second flow rate control valve 152 may be installed on the recovery pipe 45 to control opening and closing of the recovery pipe 45. That is, the second flow rate control valve 152 may adjust the opening and closing degree of the recovery pipe 45 to control a flow rate passing therethrough.

A process of separating water and oil from the oil-water mixture in the continuous oil-water separation system 100 configured as described above is as follows.

When the oil-water mixture from the storage tank 50 enters the filter housing 110 through the pump 52, only water passes through the super-hydrophilic oil-water separation filter 120 due to selective wetting characteristic of the super-hydrophilic oil-water separation filter 120 in the filter housing 110. This water is recovered at a limited flow rate by the first flow rate control valve 151 and collected by the water recovery unit 70, and the mixture containing a large amount of oil that is not filtered by the super-hydrophilic oil-water separation filter 120 is continuously accumulated to increase pressure in the filter housing 110.

The pressure control valve 130 may be opened at a pressure equal to or higher than a set pressure and the mixture may be discharged through the outlet so that the pressure in the filter housing 110 may be maintained at the set level. The mixture containing a large amount of oil discharged through the operation of the pressure control valve 130 is sent to the storage tank 50 through the recovery pipe 45 at a flow rate limited by the second flow rate control valve 152 to be mixed with the oil-water mixture of the storage tank 50.

In addition, a certain level of pressure is generated between the second flow rate control valve 152 and the pressure control valve 130 by the limited flow rate of the second flow rate control valve 152, and only oil of the oil-water mixture discharged through the outlet of the filter housing 110 is collected to the oil recovery unit 60 through the super-hydrophobic membrane 140 using the predetermined level of pressure.

As such, in the continuous oil-water separation system 100 according to the present exemplary embodiment, the amount of the oil-water mixture entering through the pump 52 and the amount of fluid (water+oil+recovered oil-water mixture) discharged through the continuous oil-water separation system 100 are equal to each other, thereby maintaining the internal pressure of the system, so that the super-hydrophilic oil-water separation filter 120 may not be contaminated and a large amount of oil-water mixture may be continuously processed.

Figure 2:
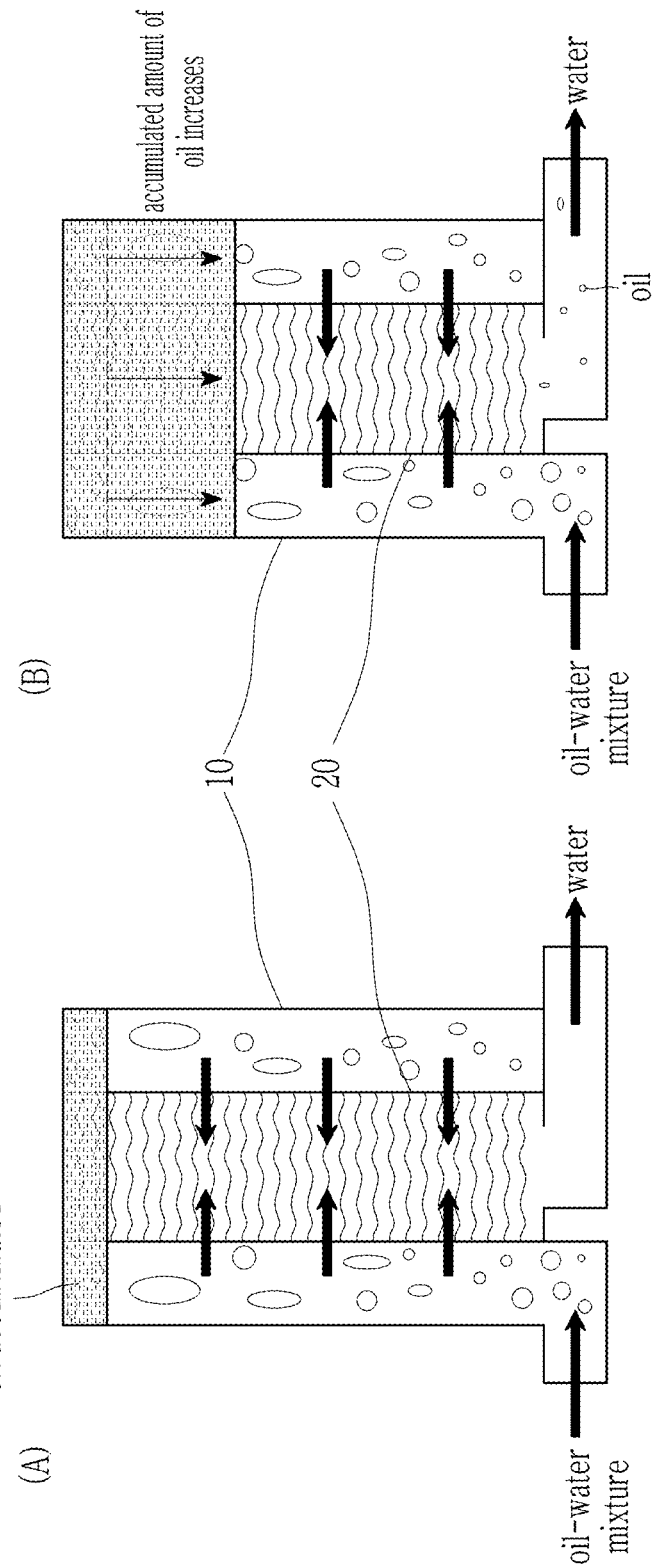
FIG. 2 is a diagram illustrating a state in which pressure in a filter housing increases due to an increase in the amount of accumulated oil when an oil-water mixture is continuously introduced into the filter housing.
Figure 3:
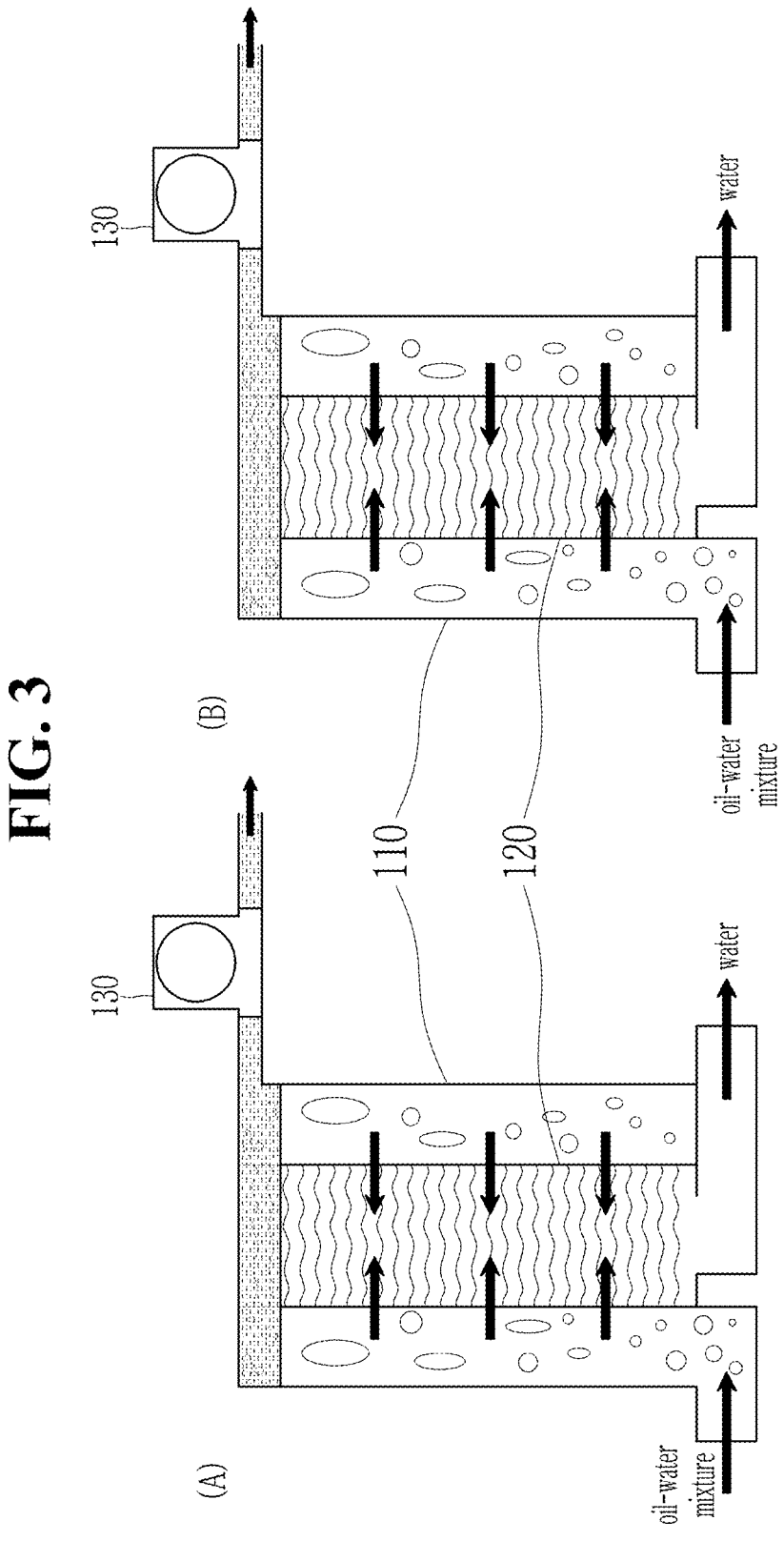
FIG. 3 is a view illustrating an oil-water separation filter in which a pressure control valve is installed in a filter housing.

FIG. 2 is a diagram illustrating a state in which pressure in a filter housing increases due to an increase in the amount of accumulated oil when an oil-water mixture is continuously introduced into the filter housing, and FIG. 3 is a view illustrating an oil-water separation filter in which a pressure control valve is installed in a filter housing.

Referring to FIG. 2, it can be seen that (B) the pressure in the filter housing 10 increases due to an increase in the amount of accumulated oil in the case of B compared with case (A). Here, (B) shows that oil-water separation efficiency is lowered as oil, as well as water, is partially absorbed through the filter 20t.

Referring to FIG. 3, the pressure applied to the filter 120 is maintained at a predetermined level by maintaining the amount of oil accumulated in the filter housing 110 at a predetermined level through the pressure control valve 130.

Figure 4:
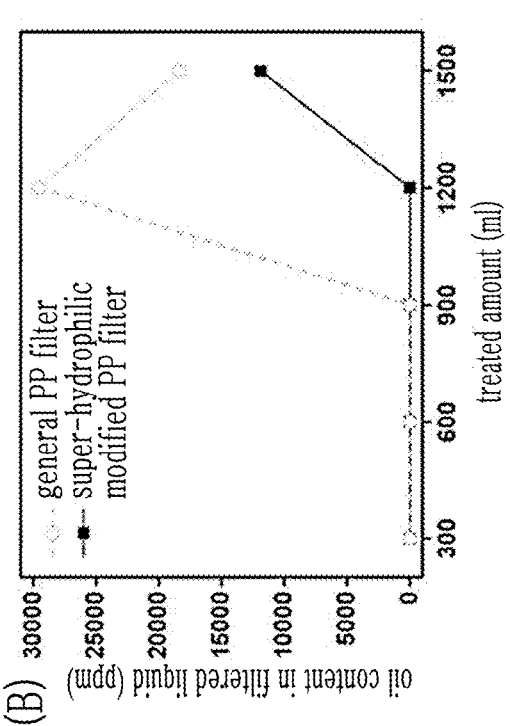
FIG. 4 is a graph (A) illustrating pressure applied to a filter during oil-water separation by applying a general polypropylene (PP) filter and a super-hydrophilic modified polypropylene (PP) filter to a filter housing without a pressure control valve shown in FIG. 2 and a graph (B) illustrating an oil content in a filtered liquid (water).
Figure 4:
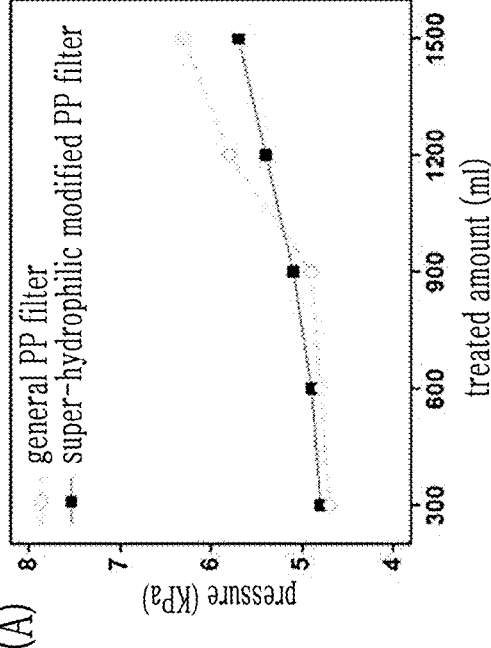
Figure 5:
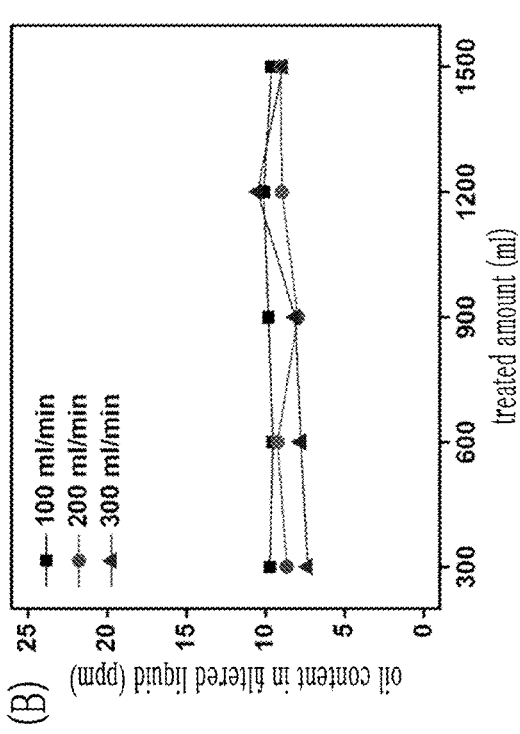
FIG. 5 is a graph (A) illustrating pressure according to a treated amount when oil-water separation is performed with a super-hydrophilic oil-water separation filter after a pressure control valve is installed, and a graph (B) illustrating an oil content in a filtered liquid according to treated amount.
Figure 5:
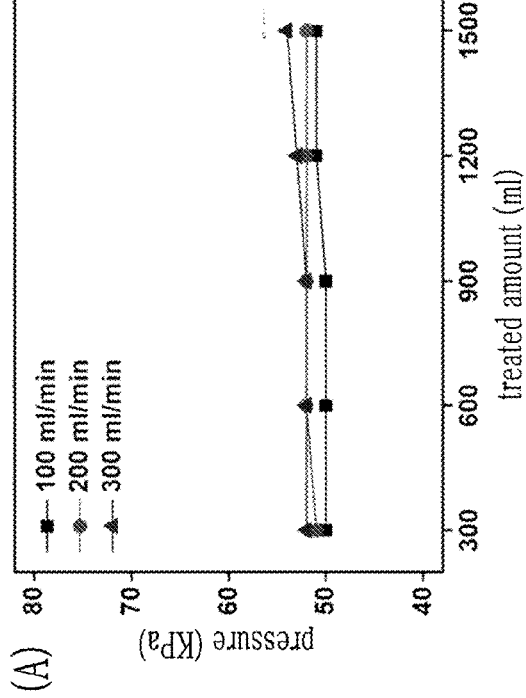

FIG. 4 is a graph (A) illustrating pressure applied to a filter during oil-water separation by applying a general polypropylene (PP) filter and a super-hydrophilic modified polypropylene (PP) filter to a filter housing without a pressure control valve shown in FIG. 2 and a graph (B) illustrating an oil content in a filtered liquid (water).

In oil-water separation using a PP filter of the related art, when an oil-water mixture (water:oil=4:1) is introduced, the oil is absorbed inside the filter due to the hydrophobicity/ oleophilicity of PP, so the pressure does not increase significantly. However, after the PP filter is filled with oil, a flow path of the fluid is blocked due to the oil clogged inside the filter, and the pressure may increase rapidly (see (a)). Therefore, when the treated amount of oil-water mixture is small, all the oil is absorbed by the filter and the oil content in the filtered water is small, but when a large amount of oil-water mixture is treated, pressure applied to the filter increases rapidly and oil trapped in the filter may leak out so that the oil content in the filtered water may increase rapidly (refer to (B)).

Meanwhile, in the case of performing oil-water separation using a super-hydrophilic filter, if oil does not pass through the filter and accumulates continuously, the pressure applied to the filter may also increase steadily (refer to (A)). When the pressure applied to the filter is low, oil-water separation is good and the oil content in the filtered water is very low, but when the pressure applied to the filter is high, oil may penetrate through the filter to increase the oil content in the filtered water (Refer to (B)).

That is, when performing oil-water separation using a super-hydrophilic filter, the oil-water separation performance is superior to when using the existing PP filter, but when the pressure applied to the filter is increased as the treated amount of oil-water mixture increases, oil may penetrate into the filter to degrade efficiency. Therefore, it can be seen that, even in the case of recovering purified water from the oil-water mixture with the super-hydrophilic filter, a pressure control valve is required to treat a large amount of oil-water mixture.

FIG. 4 is a graph (A) illustrating pressure according to a treated amount when oil-water separation is performed with a super-hydrophilic oil-water separation filter after a pressure control valve is installed, a graph (B) illustrating an oil content in filtered liquid according to the treated amount.

Referring to (A) of FIG. 4, it can be seen that the pressure is maintained at a certain level even at various oil-water treatment rates, and referring to (B), it can be seen that the oil content in the filtered water is very low even at various oil-water treatment rates.

Figure 6:
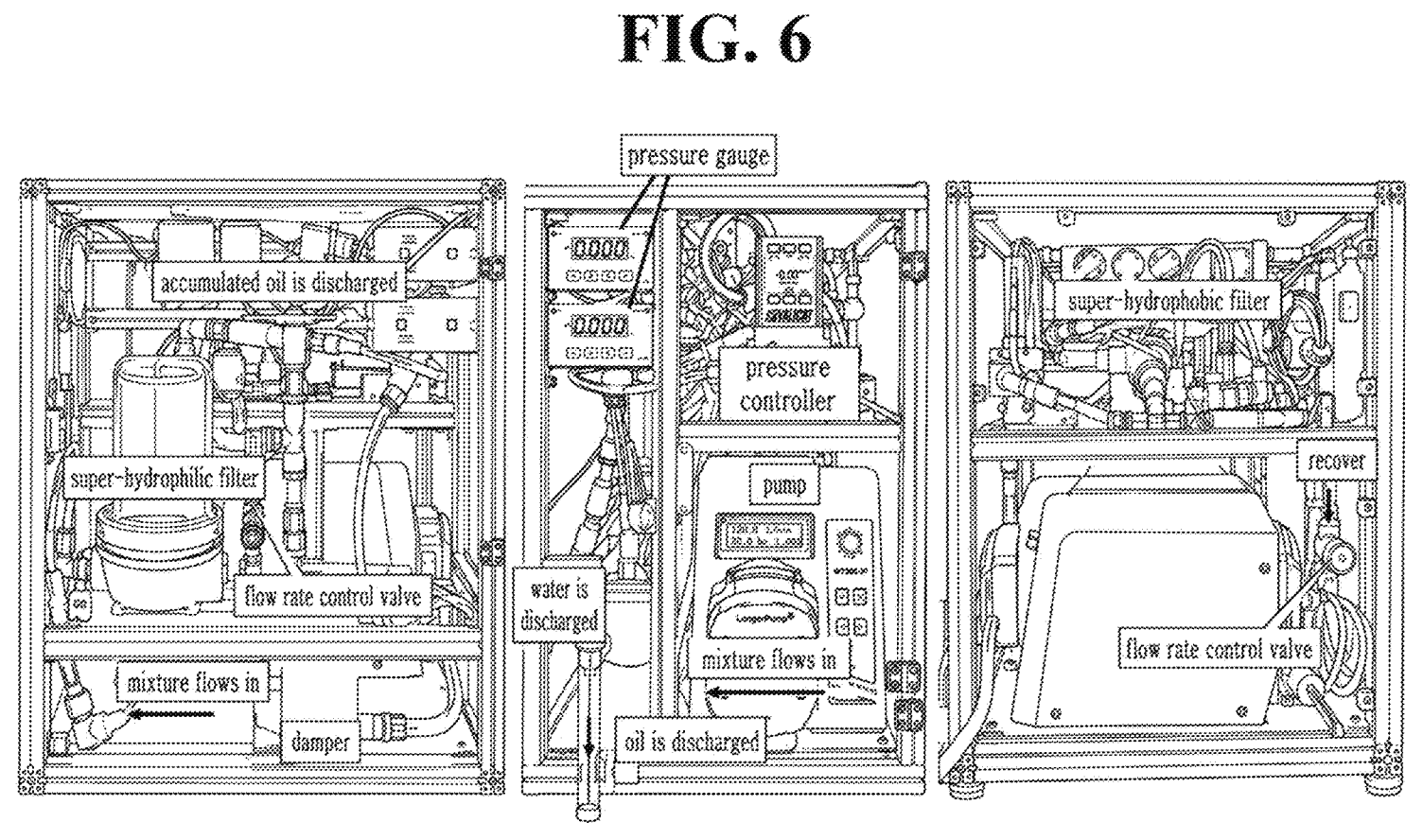
Figure 7:
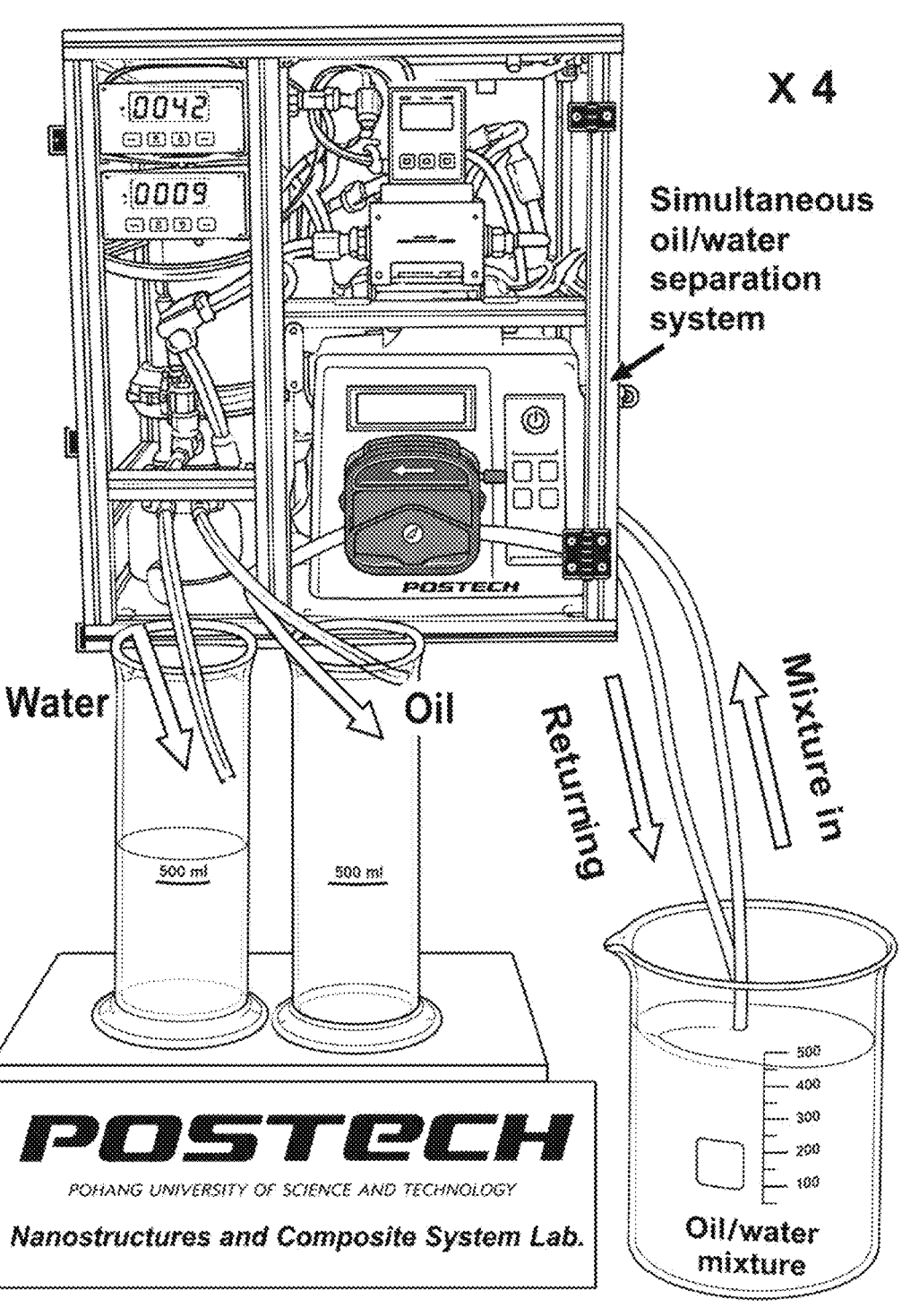
FIG. 7 is a photograph illustrating separation of an oil-water mixture by the continuous oil-water separation system using a super-hydrophilic oil-water separation filter of FIG. 6.

FIG. 6 is a photograph of the system actually implementing a continuous oil-water separation system using a super-hydrophilic oil-water separation filter schematically shown in FIG. 1, and FIG. 7 is a photograph illustrating separation of an oil-water mixture by the continuous oil-water separation system using a super-hydrophilic oil-water separation filter of FIG. 6.

Water and oil may be simultaneously separated by the continuous oil-water separation system described above, and residual oil-water mixture that has not passed through the filter is also recovered, all the fluids introduced into the system may be discharged, so that internal pressure of the system may be maintained constant.

Figure 8:
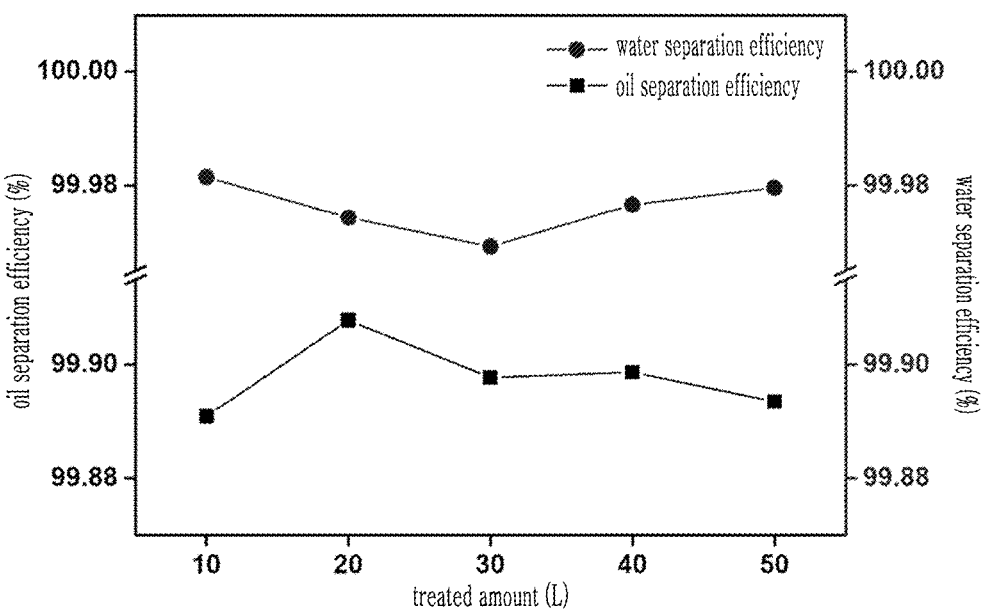
FIG. 8 is a graph illustrating oil-water separation efficiency after continuously treating a large amount of oil-water mixture with the continuous oil-water separation system shown in FIG. 6.

FIG. 8 is a graph illustrating oil-water separation efficiency after continuously treating a large amount of oil-water mixture with the continuous oil-water separation system shown in FIG. 6.

Referring to FIG. 8, the oil separation efficiency after a treatment of 10 L was 99.891% and water separation efficiency was 99.981%, which was very high, and even after 50 L oil-water mixture treatment, the oil separation efficiency was 99.894% and the water separation efficiency was 99.980%, showing that high oil-water separation efficiency is maintained.

Figure 9:
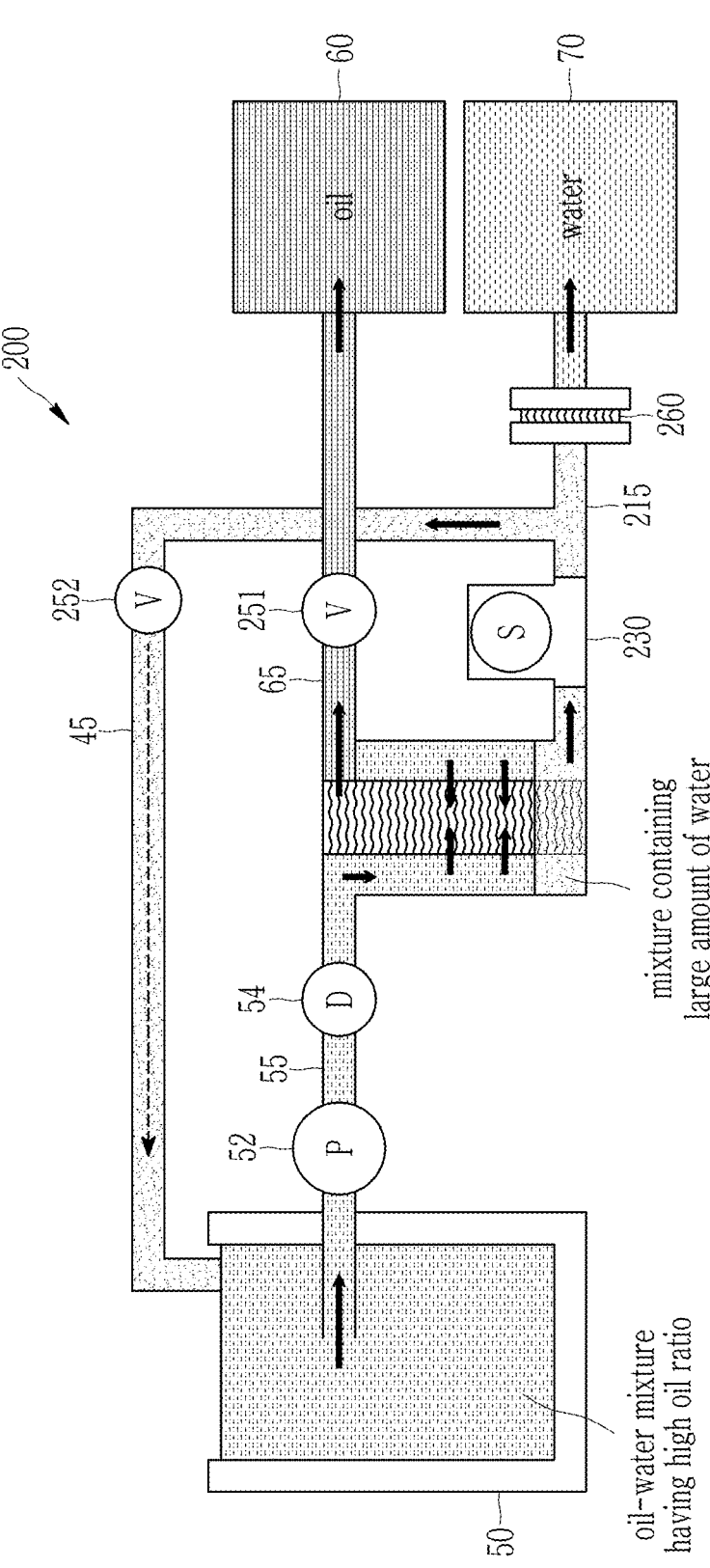
FIG. 9 is a configuration diagram schematically illustrating a continuous oil-water separation system according to another exemplary embodiment of the present disclosure.

FIG. 9 is a configuration diagram schematically illustrating a continuous oil-water separation system according to another exemplary embodiment of the present disclosure.

The system shown in FIG. 9 is a system capable of simultaneously separating water and oil in an oily environment when the super-hydrophilic oil-water separation filter is replaced with a super-hydrophobic oil-water separation filter in the continuous oil-water separation system shown in FIG. 1.

Referring to FIG. 9, a continuous oil-water separation system 200 according to the present exemplary embodiment is configured by connecting a filter housing 210 including a super-hydrophobic oil-water separation filter 220 to the storage tank 50 storing an oil-water mixture.

The storage tank 50 has an inflow portion and an outflow portion, and an oil-water mixture may be discharged through the outflow portion and supplied to the filter housing 210, and an oil-water mixture may be supplied to the storage tank 50 from the outside through the inflow portion. The outflow portion of the storage tank 50 may be connected to the inlet of the filter housing 210, through which a supply pipe 55 through which an oil-water mixture may be transported may be provided. A pump 52 and a damper 54 may be installed on the supply pipe 55 to control supply of the oil-water mixture.

The filter housing 210 may include a storage space having a predetermined height, and may include an inlet, an oil drain hole, and an outlet. The inlet may be connected to the outflow portion of the storage tank 50 so that the oil-water mixture may be introduced therethrough, and the outlet may allow the residual oil-water mixture to flow out therethrough after the oil-water separation. In this case, the inlet may be fluidly connected to an upper end of the storage space of the filter housing 210, and the outlet may be fluidly connected to a lower end of the storage space of the filter housing 210. The oil drain hole may be fluidly connected to an upper end of the super-hydrophobic oil-water separation filter 220 so that oil separated from the oil-water mixture may be discharged therethrough.

An oil drain pipe 65 may be connected to the oil drain hole of the filter housing 210, and the oil drain pipe 65 may be connected to the oil recovery unit 60. In addition, a first flow rate control valve 251 may be installed on the oil drain pipe 65 to control opening and closing of the oil drain hole. That is, the first flow rate control valve 251 may control the degree of opening and closing of the oil drain hole to control a flow rate passing through the oil drain hole.

The super-hydrophobic oil-water separation filter 220 may be located in the storage space of the filter housing 210 and may absorb oil from the supplied oil-water mixture. The oil drain hole may be connected to the super-hydrophobic oil-water separation filter 220 to discharge the absorbed oil. The super-hydrophobic oil-water separation filter 220 may be provided in a central portion of the filter housing 210 in a columnar shape extending in a height direction of the filter housing 210.

An outlet pipe 215 may extend from the outlet of the filter housing 210. A pressure control valve 230 may be installed on the outlet pipe 215 to sense pressure inside the filter housing 210 and to control opening and closing of the outlet according to the set pressure. A super-hydrophilic membrane 260 may be connected to a rear end of the pressure control valve 230 on the outlet pipe 215. The outlet pipe 215 may be connected to the water recovery unit 70 via the super-hydrophilic membrane 260.

A recovery pipe 45 connecting the outlet pipe 215 at the rear end of the pressure control valve 230 and the inflow portion of the storage tank 50 may be provided. A second flow rate control valve 252 may be installed on the recovery pipe 45 to control opening and closing of the recovery pipe 45. That is, the second flow rate control valve 252 may control the degree of opening and closing of the recovery pipe 45 to control a flow rate passing therethrough.

Figure 10:
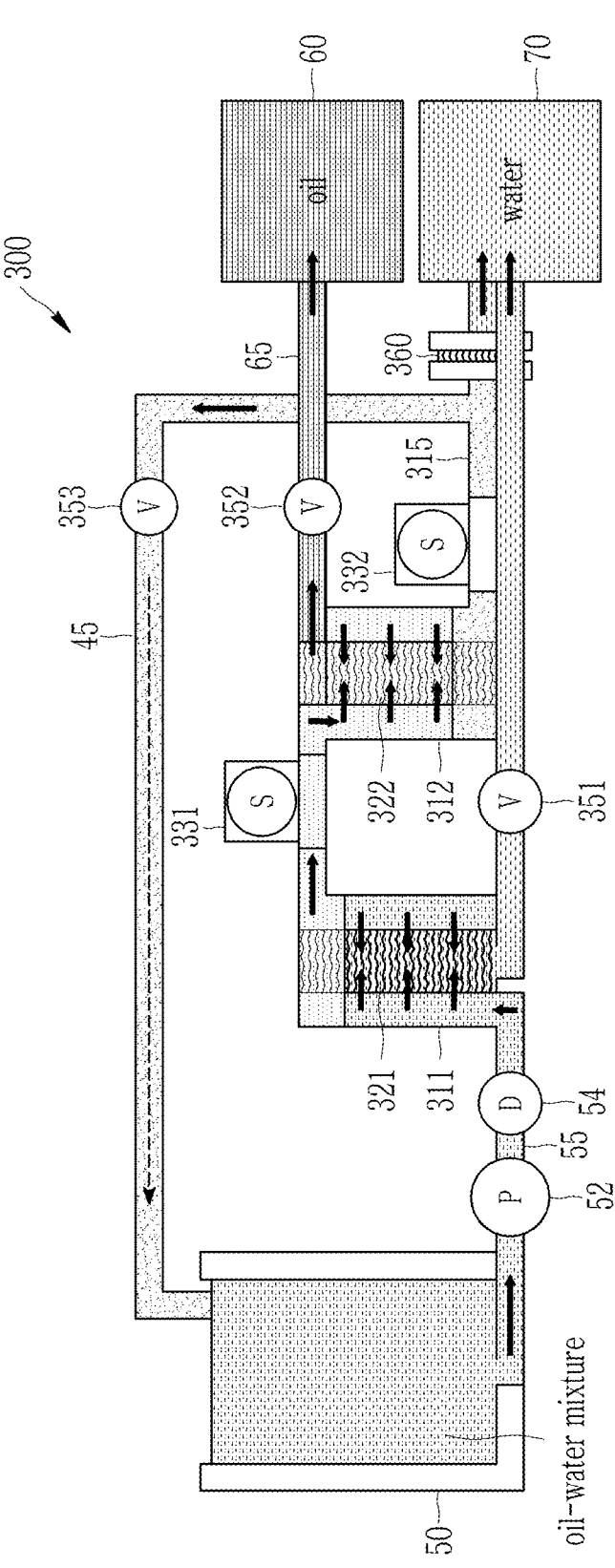
FIG. 10 is a configuration diagram schematically illustrating a continuous oil-water separation system according to another exemplary embodiment of the present disclosure.

FIG. 10 is a configuration diagram schematically illustrating a continuous oil-water separation system according to another exemplary embodiment of the present disclosure. The system shown in FIG. 10 is an oil-water separation system capable of recovering high-purity water and high-purity oil by combining a continuous oil-water separation system using a super-hydrophilic oil-water separation filter and a continuous oil-water separation system using a super-hydrophobic oil-water separation filter.

Referring to FIG. 10, in the continuous oil-water separation system 300 according to the present exemplary embodiment, a first filter housing 311 in which a super-hydrophilic oil-water separation filter 321 is installed is connected to the storage tank 50 storing an oil-water mixture. In addition, the second filter housing 312 in which the super-hydrophobic oil-water separation filter 322 is installed may be connected to the first filter housing 311 and connected to the storage tank 50.

The storage tank 50 may have an inflow portion and an outflow portion, the oil-water mixture may be discharged through the outflow portion to be supplied to the first filter housing 311, and the oil-water mixture may be supplied to the storage tank 50 from the outside through the inflow portion. A supply pipe 55 may be provided to connect the outflow portion of the storage tank 50 and a first inlet of a first filter housing 311, through which the oil-water mixture may be transported. A pump 52 and a damper 54 may be installed on the supply pipe 55 to control supply of the oil-water mixture.

The first filter housing 311 may include a storage space having a predetermined height and may have a first inlet, a water drain hole, and a first outlet. The first inlet may be connected to the outflow portion of the storage tank 50 so that the oil-water mixture may be introduced, and the first outlet may allow a residual oil-water mixture to be discharged therethrough after the oil-water separation. In this case, the first inlet may be fluidly connected to a lower end of the storage space of the first filter housing 311, and the first outlet may be fluidly connected to an upper end of the storage space of the first filter housing 311. The water drain hole may be fluidly connected to a lower end of the super-hydrophilic oil-water separation filter 321 so that water separated from the oil-water mixture may be discharged therethrough. In addition, a first pressure control valve 331 may be connected to the first outlet of the first filter housing 311 to control opening and closing of the first outlet, while sensing internal pressure of the first filter housing 311.

A water drain pipe 75 may be connected to the water drain hole of the first filter housing 311, and a water drain pipe 75 may be connected to the water recovery unit 70. In addition, a first flow rate control valve 351 may be installed on the water drain pipe 75 to control opening and closing of the water drain hole. That is, the first flow rate control valve 351 may control the degree of opening and closing of the water drain hole to adjust a flow rate passing therethrough.

The super-hydrophilic oil-water separation filter 321 may be located in the storage space of the first filter housing 311 and may absorb water from the supplied oil-water mixture. The water drain hole may be connected to the super-hydrophilic oil-water separation filter 321 to discharge the absorbed water. The super-hydrophilic oil-water separation filter 321 may be provided in a central portion of the first filter housing 311 in a columnar shape extending in a height direction of the first filter housing 311.

The second filter housing 312 may include a storage space having a predetermined height and may have a second inlet, an oil drain hole, and a second outlet. The second inlet may be connected to the first outlet of the first filter housing 311 so that a residual oil-water mixture may be introduced from the first filter housing 311, and the second outlet may allow a residual oil-water mixture to be discharged therethrough after oil-water separation. In this case, the second inlet may be fluidly connected to an upper end of the storage space of the second filter housing 312, and the second outlet may be fluidly connected to a lower end of the storage space of the second filter housing 312. The oil drain hole may be fluidly connected to an upper end of the super-hydrophobic oil-water separation filter 322 so that oil separated from the oil-water mixture may be discharged therethrough.

The oil drain pipe 65 may be connected to the oil drain hole of the second filter housing 312, and the oil drain pipe 65 may be connected to the oil recovery unit 60. In addition, a second flow rate control valve 352 may be installed on the oil drain pipe 65 to control opening and closing of the oil drain hole. That is, the second flow rate control valve 352 may control the degree of opening and closing of the oil drain hole to control a flow rate passing therethrough.

The super-hydrophobic oil-water separation filter 322 may be located in the storage space of the second filter housing 312 and may absorb oil from the supplied oil-water mixture. The oil drain hole may be connected to the super-hydrophobic oil-water separation filter 322 to discharge the absorbed oil. The super-hydrophobic oil-water separation filter 322 may be provided in a central portion of the second filter housing 312 in a columnar shape extending in a height direction of the second filter housing 312.

A second pressure control valve 332 may be installed on an outlet pipe 315 extending from the second outlet of the second filter housing 312 to sense pressure inside the second filter housing 312, and may control opening and closing of the outlet according to a set pressure. A super-hydrophilic membrane 360 may be connected to a rear end of the second pressure control valve 332. The outlet pipe 315 may be connected to water recovery unit 70 via the super-hydrophilic membrane 360.

A recovery pipe 45 connecting the outlet pipe 315 and the inflow portion of the storage tank 50 may be provided at a rear end of the second pressure control valve 332. A third flow rate control valve 353 may be installed on the recovery pipe 45 to control opening and closing of the recovery pipe 45. That is, the third flow rate control valve 353 may control the degree of opening and closing of the recovery pipe 45 to control a flow rate passing therethrough.

Meanwhile, the super-hydrophilic oil-water separation filter that may be used in the continuous oil-water separation system according to the exemplary embodiment shown in FIGS. 1, 9 and 10 will be described in detail below.

Figure 11:
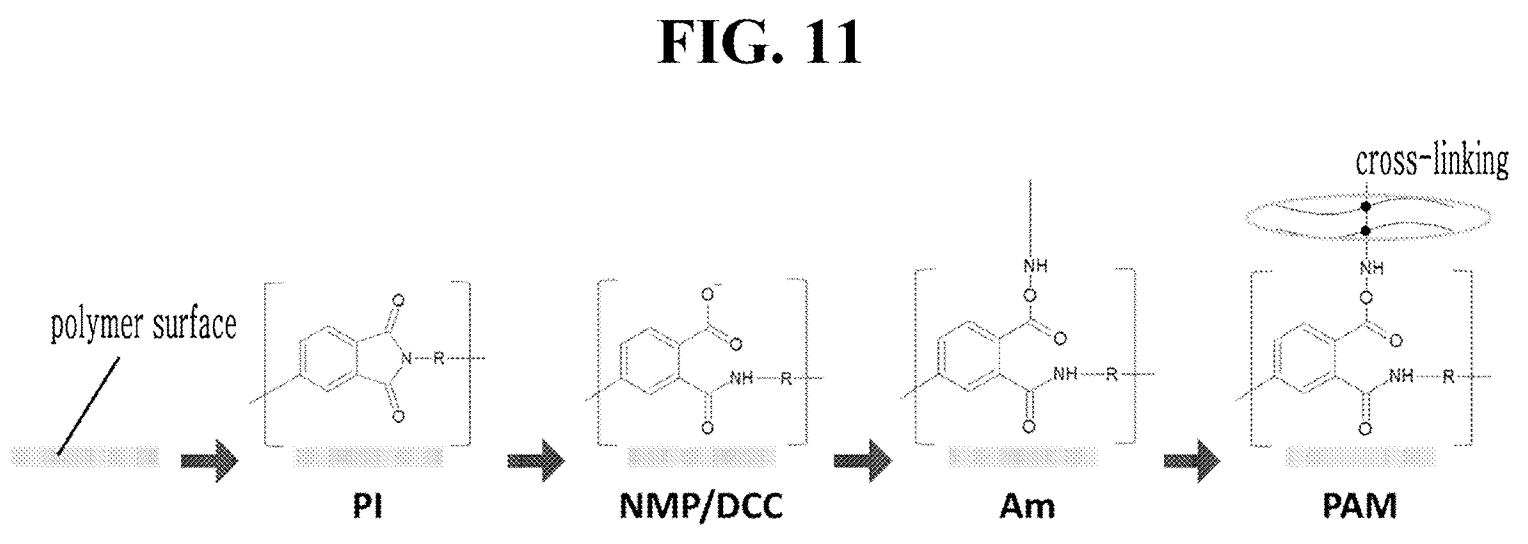

FIG. 11 shows a process of forming a hydrogel layer by performing multi-wet coating on a polymer substrate surface according to an exemplary embodiment of the present disclosure, and a method of treating a super-hydrophilic surface of a polymer-based filter will be described with reference to FIG. 11 as follows.

First, a thermosetting coating layer is formed on a surface of a polymer-based filter (S10). The thermosetting coating layer may include polyimide (PI) or polyamic acid (PAA).

As a thermosetting coating solution, a solution prepared by diluting a resin containing polyimide or polyamic acid alone or a mixture thereof at a weight ratio set within a range of 1 to 20 wt % in an organic solvent such as NMP (N-Methyl-2-pyrrolidone), DMAC (dimethylacetamide), or DMF (Dimethylformamide) may be used as a coating solution. After soaking in the prepared coating solution for 5 minutes to 1 hour, taking it out carefully, applying the solution to the surface, and then curing and drying at 110 to 130° C. for a set time in the range of 20 minutes to 1 hour so that the thermosetting coating layer may be evenly formed on the surface.

Next, a carboxylate group (—COO—) is formed on the surface of the thermosetting coating layer (S20). That is, a carboxylic acid group (—COOH) is formed by dissolving the thermosetting coating layer and then reacted with N,N-dicyclohexylcarbodiimide (DCC) to form a carboxylate group (—COO—).

In order to induce a strong bond between the thermosetting coating layer and the hydrogel layer, the surface coated with the thermosetting polymer may be immersed in a DCC solution at room temperature for 5 to 30 minutes to form a carboxylate group. The DCC solution may be prepared by dissolving DCC crystal powder in an organic solvent such as NMP at a weight ratio set in the range of 0.5 to 5 wt %.

Next, an amide bond is formed between the thermosetting coating layer and the hydrogel monomers (S30). In this case, acrylamide (Am) monomers may be reacted with the carboxylate group (—COO—) to form an amide bond. In order to form the amide bond, a filter on which the thermosetting coating layer was formed was immersed in DCC solution at 25° C. for 10 minutes. The DCC solution was prepared by diluting N,N-dicyclohexylcarbodiimide (DCC) crystalline powder in NMP at a weight ratio of 0.5%.

The carboxylate group reacts with acrylamide to form an amide bond (—CONH—), which is a strong chemical bond. The amide bond is formed by immersing a surface on which carboxylate groups are formed by coating up to a second step in an Am solution (a solution prepared by adding 20% Am powder to a solvent in which the ratio of water and ethanol is 3:1) at 65° C. for 60 minutes.

Next, the hydrogel monomers are cross-linked to form a hydrophilic polymer layer (S40). In this case, the acrylamide (Am) chains are cross-linked using bisacrylamide (BIS) and ammonium persulfate (APS) to form a hydrophilic polymer layer that is a polyacrylamide (PAM) hydrogel layer.

Acrylamide (Am) chains may be cross-linked with BIS to form a PAM hydrogel layer to implement a super-hydrophilic surface. A crosslinking solution may be prepared by dissolving APS powder in a weight ratio of 1 to 5 wt % in water as a solvent and dissolving 30 to 50 mM of BIS.

The super-hydrophilic surface treatment method described above may be applied to a polymer-based filter, and a polymer material of the filter may be applied to surfaces of various polymers such as polypropylene (PP), polyethylene (PE), polyvinylidene fluoride (PVDF)), polytetrafluoroethylene (PTFE), etc. A super-hydrophilic polymer filter may be manufactured by applying a multi-wet coating process for a super-hydrophilic surface treatment to the polymer filter. The super-hydrophilic polymer filter manufactured through the above method may form a water film to block contact with oil and selectively transmit only water in the oil-water mixture, thereby performing oil-water separation.

That is, the filter manufactured according to the above method may include a polymer-based filtration filter and a thermosetting coating layer and a hydrogel layer formed on the surface of the polymer-based filtration filter, and in the filtration filter, the thermosetting coating layer and the hydrogel layer are bonded by acrylamide cross-linking to provide an oil-water separation filter or filter medium, more preferably a depth filter.

Such an oil-water separation filter may have super-hydrophilicity with a contact angle of 10° or less with respect to water in the air and/or oleophobicity with a contact angle of 150° to 180°, more preferably 150° to 170°, with respect to oil in water.

In addition, the oil-water separation filter is a super-hydrophilic filter that is completely wetted with water at a contact angle of 10° or less with water, and is completely wet with water to form a water film, so adhesion with oil is very low. Therefore, water in the oil-water mixture passes and oil is blocked by the water film, so oil-water separation may be performed. This super-hydrophilic filter has almost no contamination by oil, so the super-hydrophilic filter may be usefully used as a filter for oil-water separation.

In addition, as an example of a super-hydrophilic oil-water separation filter that may be used in a continuous oil-water separation system according to exemplary embodiments of the present disclosure, a depth filter may have a structure in which polymer fibers are laminated in multiple layers to form a cylindrical shape. Such a cylindrical depth filter performs a filtration function by a mechanism for collecting particles inside the filter, while passing through a non-linear movement path in a media layer having a thickness of several mm to tens of mm, and since the depth filter has a large surface area per unit volume, the depth filter is very effect for removing contaminants. For example, the polymer filter is formed of polymer fibers having a diameter of 10 to 50 μm, the polymer fibers are randomly crossed to form pores, and the pores is 100 μm or less in diameter, for example, 10 μm to 100 μm in diameter. Fluid passes through these pores, and contaminants do not pass through the pores and accumulate outside the filter.

Although the exemplary embodiment of the present disclosure has been described above, the present disclosure is not limited thereto, and it is possible to carry out various modifications within the claim coverage, the description of the invention, and the accompanying drawings, and such modifications also fall within the scope of the present disclosure.

<Description of reference numerals>

45: recovery pipe
50: storage tank
52: pump
54: damper
65: oil drain pipe
70: water recovery unit
75: water drain pipe
100, 200, 300: continuous oil-water separation system
110, 210, 311, 312: filter housing
115, 215, 315: outlet pipe
120, 321: super-hydrophilic oil-water separation filter
130, 230, 331,332: pressure control valve
140: super-hydrophobic membrane
151, 152, 251, 252, 351, 352, 353: flow rate control valve
220, 322: super-hydrophobic oil-water separation filter
260, 360: super-hydrophilic membrane

The invention claimed is:
1. A continuous oil-water separation system comprising:
a storage tank having an inflow portion and an outflow portion and storing an oil-water mixture;
a filter housing including a storage space having a predetermined height and including an inlet connected to the outflow portion of the storage tank to allow the oil-water mixture to flow in therethrough, a water drain hole allowing water separated from the oil-water mixture to be discharged therethrough, and an outlet allowing a residual oil-water mixture to flow out therethrough;

a super-hydrophilic oil-water separation filter positioned in the storage space of the filter housing to absorb water from the oil-water mixture and connected to the water drain hole to allow the absorbed water to be discharged therethrough;

a pressure control valve installed on an outlet pipe extending from the outlet; and a super-hydrophobic membrane connected to a rear end of the pressure control valve on the outlet pipe, wherein the super-hydrophilic oil-water separation filter includes polymer base fibers and a thermosetting coating layer and a hydrogel layer formed on surfaces of the fibers, wherein the thermosetting coating layer includes polyimide (PI) or polyamic acid (PAA) having carboxyl groups (—COO—) on a surface thereof, wherein the hydrogel layer includes polyacrylamide (PAM) crosslinked by a crosslinking agent including bisacrylamide (BIS), and wherein the hydrogel layer is chemically bonded to the thermosetting coating layer via amide bonds (—CONH—) formed between the carboxyl groups and acrylamide monomers, wherein the filter has a structure in which the polymer base fibers are stacked in multiple layers to form a cylindrical shape, wherein the filter has super-hydrophilicity having a contact angle with water in the air of 10° or less.

2. The continuous oil-water separation system of claim 1, wherein the inlet is fluidly connected to a lower end of the storage space of the filter housing, the outlet is fluidly connected to an upper end of the storage space of the filter housing, and the water drain hole is fluidly connected to a lower end of the super-hydrophilic oil-water separation filter.

3. The continuous oil-water separation system of claim 1, wherein the super-hydrophilic oil-water separation filter is provided in a central portion of the filter housing in a columnar shape extending in a height direction of the filter housing.

4. The continuous oil-water separation system of claim 1, wherein the polymer base fibers includes one or more selected from the group consisting of polypropylene (PP), polyethylene (PE), polyvinylidene fluoride (PVDF), and polytetrafluoroethylene (PTFE).

5. The continuous oil-water separation system of claim 1, wherein each of the polymer base fibers has a diameter of 10 to 50 micrometers.

6. A continuous oil-water separation system comprising:

a storage tank having an inflow portion and an outflow portion and storing an oil-water mixture;

a first filter housing having a storage space having a predetermined height and including a first inlet connected to the outflow portion of the storage tank to allow the oil-water mixture to flow in therethrough, a water drain hole allowing water separated from the oil-water mixture to be discharged therethrough, and a first outlet allowing a residual oil-water mixture to flow out therethrough;

a super-hydrophilic oil-water separation filter positioned in the storage space of the first filter housing to absorb water from the oil-water mixture and connected to the water drain hole to allow the absorbed water to be discharged therethrough;

a first pressure control valve connected to the first outlet to control opening and closing of the first outlet;

a second filter housing including a storage space having a predetermined height and having a second inlet connected to the first outlet of the first filter housing to allow the oil-water mixture to flow in therethrough, an oil drain hole allowing oil separated from the oil-water mixture to be discharged therethrough, and a second outlet allowing a residual oil-water mixture to be discharged therethrough;

a super-hydrophobic oil-water separation filter positioned within the storage space of the second filter housing to absorb oil from the oil-water mixture, and connected to the oil drain hole to discharge the absorbed oil;

a second pressure control valve installed on an outlet pipe extending from the second outlet; and a super-hydrophilic membrane connected to a rear end of the second pressure control valve on the outlet pipe, wherein the super-hydrophilic oil-water separation filter includes polymer base fibers and a thermosetting coating layer and a hydrogel layer formed on surfaces of the fibers, wherein the thermosetting coating layer includes polyimide (PI) or polyamic acid (PAA) having carboxyl groups (—COO—) on a surface thereof, wherein the hydrogel layer includes polyacrylamide (PAM) crosslinked by a crosslinking agent including bisacrylamide (BIS), and wherein the hydrogel layer is chemically bonded to the thermosetting coating layer via amide bonds (—CONH—) formed between the carboxyl groups and acrylamide monomers, wherein the filter has a structure in which the polymer base fibers are stacked in multiple layers to form a cylindrical shape, wherein the filter has super-hydrophilicity having a contact angle with water in the air of 10° or less.

7. The continuous oil-water separation system of claim 6, wherein the first inlet is fluidly connected to a lower end of the storage space of the first filter housing, the first outlet is fluidly connected to an upper end of the storage space of the first filter housing, and the water drain hole is fluidly connected to a lower end of the super-hydrophilic oil-water separation filter.

8. The continuous oil-water separation system of claim 6, wherein the second inlet is fluidly connected to an upper end of the storage space of the second filter housing, the second outlet is fluidly connected to a lower end of the storage space of the second filter housing, and the oil drain hole is fluidly connected to an upper end of the super-hydrophobic oil-water separation filter.

9. The continuous oil-water separation system of claim 6, wherein the super-hydrophilic oil-water separation filter is provided in a central portion of the first filter housing in a columnar shape extending in a height direction of the first filter housing.

10. The continuous oil-water separation system of claim 6, wherein the super-hydrophobic oil-water separation filter is provided in a central portion of the second filter housing in a columnar shape extending in a height direction of the second filter housing.

11. The continuous oil-water separation system of claim 6, wherein the polymer base fibers includes one or more selected from the group consisting of polypropylene (PP), polyethylene (PE), polyvinylidene fluoride (PVDF), and polytetrafluoroethylene (PTFE).

12. The continuous oil-water separation system of claim 6, wherein each of the polymer base fibers has a diameter of 10 to 50 micrometers.

\* \* \* \* \*